(12) United States Patent
Kim

(10) Patent No.: US 8,087,690 B2
(45) Date of Patent: Jan. 3, 2012

(54) AIRBAG SYSTEM FOR VEHICLE

(75) Inventor: Eung Seo Kim, Incheon-si (KR)

(73) Assignee: Hyundai Motor Company, Seoul (KR)

( * ) Notice: Subject to any disclaimer, the term of this patent is extended or adjusted under 35 U.S.C. 154(b) by 216 days.

(21) Appl. No.: 12/325,122

(22) Filed: Nov. 28, 2008

(65) Prior Publication Data
US 2009/0295131 A1 Dec. 3, 2009

(30) Foreign Application Priority Data

Jun. 3, 2008 (KR) ........................ 10-2008-0052266

(51) Int. Cl.
B60R 21/214 (2011.01)
(52) U.S. Cl. ..................................... 280/730.1; 280/729
(58) Field of Classification Search ............... 280/730.1, 280/729, 731, 730.2
See application file for complete search history.

(56) References Cited

U.S. PATENT DOCUMENTS

| 3,795,412 | A | * | 3/1974 | John | 280/730.1 |
| 3,953,049 | A | * | 4/1976 | Surace et al. | 280/730.1 |
| 4,227,717 | A | * | 10/1980 | Bouvier | 280/753 |
| 5,470,103 | A | * | 11/1995 | Vaillancourt et al. | 280/730.1 |
| 5,529,337 | A | * | 6/1996 | Takeda et al. | 280/729 |
| 6,158,765 | A | * | 12/2000 | Sinnhuber | 280/728.3 |
| 6,786,505 | B2 | * | 9/2004 | Yoshida | 280/729 |
| 6,817,626 | B2 | * | 11/2004 | Boll et al. | 280/730.1 |
| 6,851,706 | B2 | * | 2/2005 | Roberts et al. | 280/730.1 |
| 7,131,661 | B2 | * | 11/2006 | Webber et al. | 280/728.2 |
| 7,210,701 | B2 | * | 5/2007 | Meissner et al. | 280/729 |
| 7,331,597 | B2 | * | 2/2008 | Williams | 280/728.2 |
| 7,331,600 | B2 | * | 2/2008 | Miyata | 280/730.1 |
| 7,631,891 | B2 | * | 12/2009 | Washino | 280/731 |
| 7,748,731 | B2 | * | 7/2010 | Taniyama et al. | 280/728.2 |
| 2001/0033072 | A1 | * | 10/2001 | Kumagai et al. | 280/730.1 |
| 2004/0164531 | A1 | * | 8/2004 | Riha et al. | 280/732 |
| 2004/0183288 | A1 | * | 9/2004 | Aygun et al. | 280/731 |
| 2004/0256842 | A1 | * | 12/2004 | Breed | 280/730.1 |
| 2006/0255571 | A1 | * | 11/2006 | Kismir et al. | 280/730.2 |
| 2007/0138778 | A1 | | 6/2007 | Takemura et al. | |
| 2008/0143084 | A1 | * | 6/2008 | Mizuno et al. | 280/730.1 |
| 2008/0224456 | A1 | * | 9/2008 | Kuroe et al. | 280/730.1 |
| 2009/0179404 | A1 | * | 7/2009 | Peyre et al. | 280/730.1 |
| 2009/0212537 | A1 | * | 8/2009 | Slaats et al. | 280/728.2 |

FOREIGN PATENT DOCUMENTS

JP 2004-106772 A 4/2004
* cited by examiner

Primary Examiner — Drew Brown
(74) Attorney, Agent, or Firm — Morgan, Lewis & Bockius LLP

(57) ABSTRACT

An airbag system for a vehicle may include an inflator for supplying gas pressure, an airbag housing installed in a vehicle roof above a seat, and an airbag cushion installed in the airbag housing, wherein the airbag is deployed by tearing a roof headliner using the gas pressure provided from the inflator in such a way as to enclose upper portion of an occupant sitting on the seat.

16 Claims, 5 Drawing Sheets

AIRBAG SYSTEM FOR VEHICLE

CROSS-REFERENCE TO RELATED APPLICATIONS

The present application claims priority to Korean Patent Application No. 10-2008-0052266 filed Jun. 3, 2008, the entire contents of which application is incorporated herein for all purposes by this reference.

BACKGROUND OF THE INVENTION

1. Field of the Invention

The present invention relates to an airbag system for a vehicle which is constructed such that an airbag cushion can be deployed in such a way as to enclose the head of an occupant sitting on a seat so that the upper portion of the passenger's body can be protected in all directions.

2. Description of Related Art

Currently, an airbag system for a driver's seat, which is installed on the center portion of a steering wheel, is widely used.

While the airbag system for a driver's seat is deployed in the event of a head-on collision and protects the head and the chest of the driver, it cannot properly protect the driver in the event of a side impact crash or a rollover accident. This equally applies to a passenger airbag system. For this reason, a side airbag system, a curtain airbag system, etc. have been additionally developed in an effort to decrease the extent of injury to an occupant in the event of a side impact crash or a rollover accident.

In this regard, recently, development of an airbag system for decreasing injury severity due to a collision between occupants or for preventing an occupant from being ejected out of a vehicle in the event of a side impact crash or a rollover accident is receiving greater attention. Referring to FIG. 1, an airbag system may be installed in the space defined between a roof panel 1 and a headliner 2 such that an airbag cushion 3 can be deployed between a driver's seat and a passenger's seat by tearing the headliner 2.

In conventional arts, various airbag systems have been separately developed so as to be adapted for various kinds of accidents. Thus, substantial investment costs and material costs are imposed on vehicle manufacturers due to the development of various airbag systems, and a substantial economic burden is imposed to a customer since it is necessary to purchase the various airbag systems in order to be prepared for an accident.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide for an airbag system for a vehicle in which the functions of various airbags are incorporated so that an occupant can be protected from shocks in the event of a head-on collision, a side impact crash or a rollover accident.

In an aspect of the present invention, an airbag system for a vehicle, may include an inflator for supplying gas pressure, an airbag housing installed in a vehicle roof above a seat, and/or an airbag cushion installed in the airbag housing, wherein the airbag is deployed by tearing a roof headliner using the gas pressure provided from the inflator in such a way as to enclose upper portion of an occupant sitting on the seat.

The airbag housing may be disposed between a roof panel and the roof headliner.

In non-deployed state, the airbag cushion may be folded in a shape of a hollow Hula-Hoop.

In deployed state, the airbag cushion may be shaped of a hollow tube.

A protrusion may be formed on a front surface of the airbag cushion to protect the occupant from being injured by a steering wheel. The protrusion may include a protruding chamber which is fluidly isolated from the airbag cushion.

The airbag cushion may be configured to have at least a chamber connected along a circumference of the airbag cushion, extending in a vertical direction thereof. The chambers may fluid-communicate with one another. The chambers may be column-shaped. A protrusion may be formed on a front surface of the airbag cushion to protect the occupant from being injured by a steering wheel. The protrusion may include a protruding chamber which communicates with other chambers.

The airbag cushion may be configured to enclose chest and shoulder of the occupant sitting on the seat upon deployment thereof.

The airbag cushion may be formed such that a front portion thereof has a height greater than that of a rear portion thereof.

A cover may be delimited in the roof headliner by a perforated line so that force for deploying the airbag cushion can be applied to the cover. The cover may be connected to the roof panel.

The airbag cushion may be aligned substantially along the penetrated line and positioned thereon.

The inflator may be installed on the roof headliner. The inflator may be installed on the roof headliner adjacent to a front windshield glass in a traverse direction of the vehicle.

The inflator may be installed on pillar.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
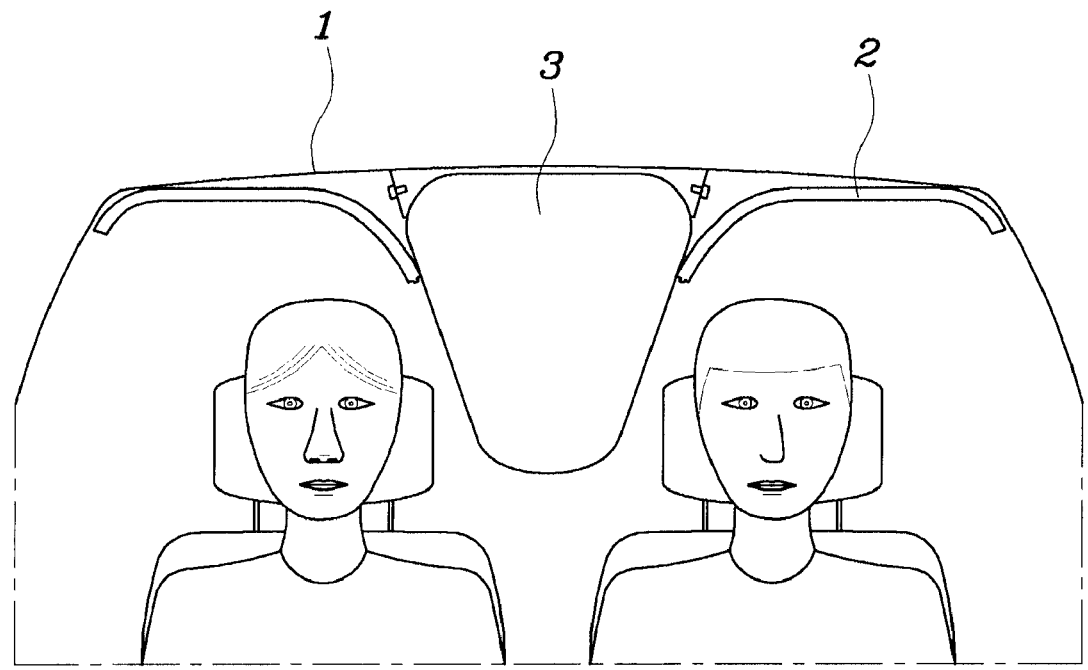
FIG. 1 is a front view illustrating a conventional airbag system.
Figure 2:
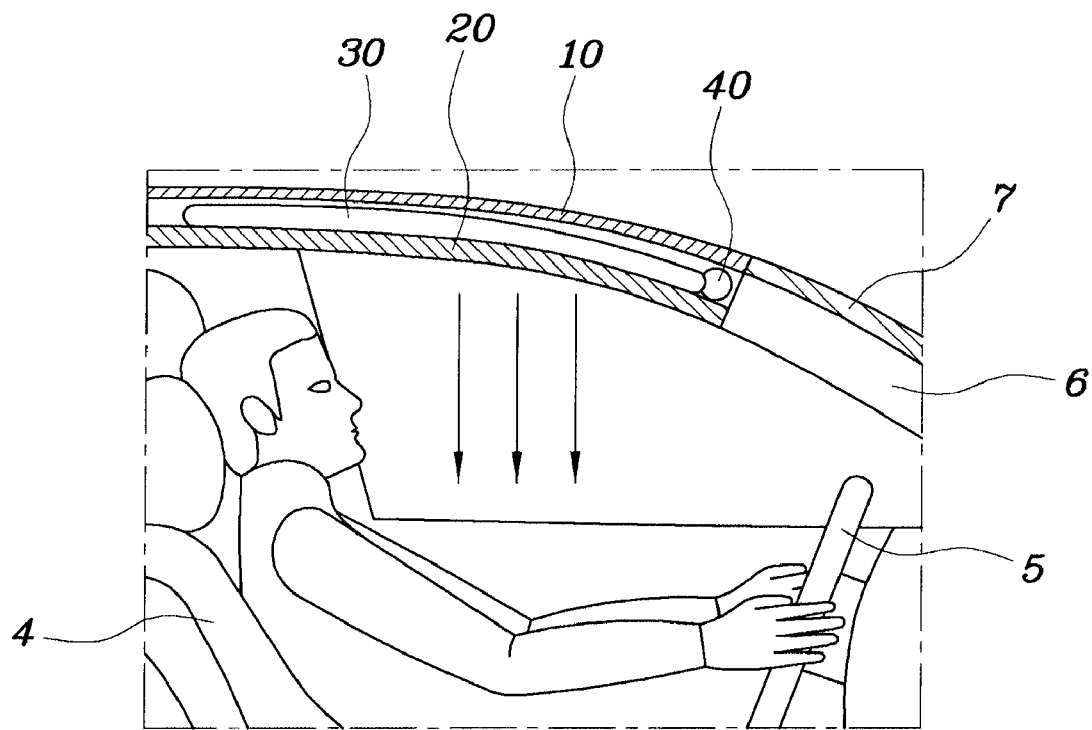
FIG. 2 is a schematic side view illustrating an exemplary airbag system for a vehicle in accordance with the present invention.
Figure 3:
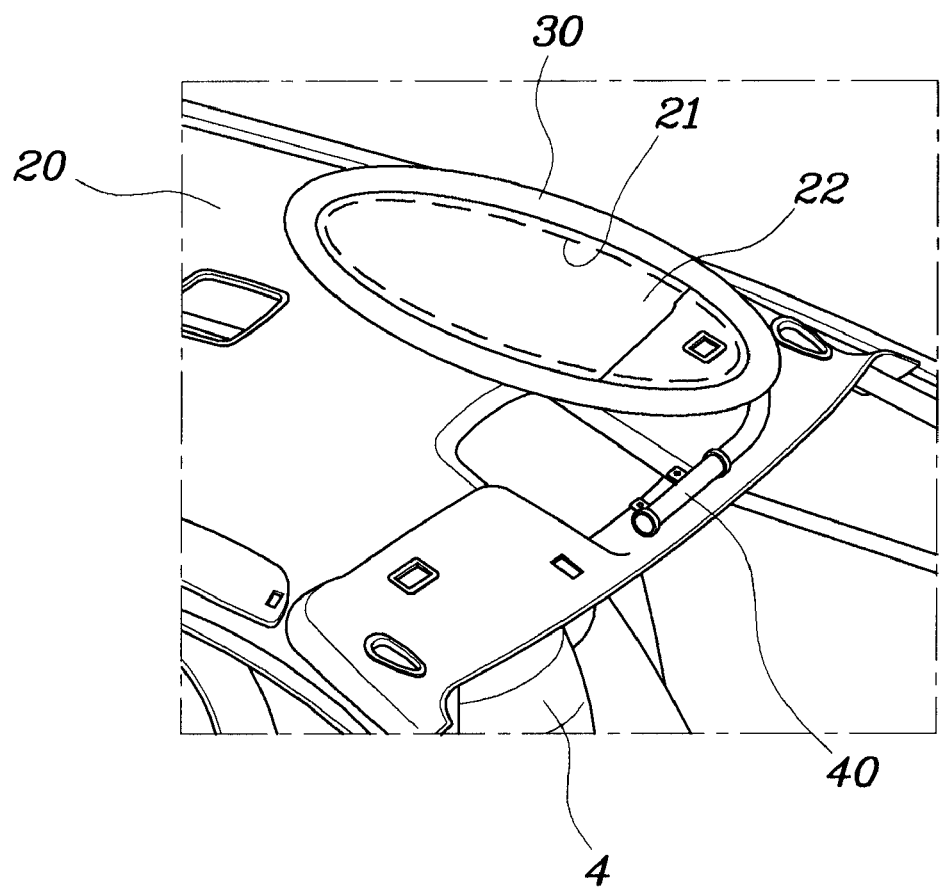
FIG. 3 is a top perspective view illustrating the airbag system shown in FIG. 2, with a roof panel removed.

Referring to FIGS. 2 and 3, an airbag system includes an airbag cushion 30 and an inflator 40, which supplies gas pressure for deploying the airbag cushion 30. The airbag cushion may be received in an airbag housing having a door for a deployment of the airbag cushion, and the airbag housing may be mounted on or in the roof panel.

The airbag housing and the airbag cushion 30 are installed in the space defined between a roof panel 10 and a headliner 20 above a seat 40, so that the airbag cushion 30 can be deployed downwards in the event of a car accident to protect an occupant. In a non-deployed state, the airbag cushion 30 is folded in the shape of a Hula-Hoop or the tube of a bicycle, as shown in FIGS. 2 and 3. If an accident occurs, the airbag cushion 30 is deployed and changes from the shape shown in FIG. 2 to the shape of a hollow cylinder, that is, a pipe (see FIG. 4).

The inflator 40 injects gas to the tube-type airbag cushion 30 in response to a signal from an airbag control unit (ACU) in the event of an accident and deploys the tube-type airbag cushion 30. As shown in FIG. 2, the inflator 40 is installed using a bracket on the headliner 20 adjacent to a front windshield glass 6 in the traverse direction of the vehicle.

In FIG. 2, the front end of the headliner 20, to which the inflator 40 is fastened, is slightly rolled upward for the purpose of finishing the roof panel 10 and is suitable for the installation of the inflator 40. As the occasion demands, a specified shape required for the installation of the inflator 40 can be formed on a corresponding portion of the headliner 20. Of course, the inflator 40 can be installed on the roof panel 10, a pillar 7 or a door.

Figure 4:
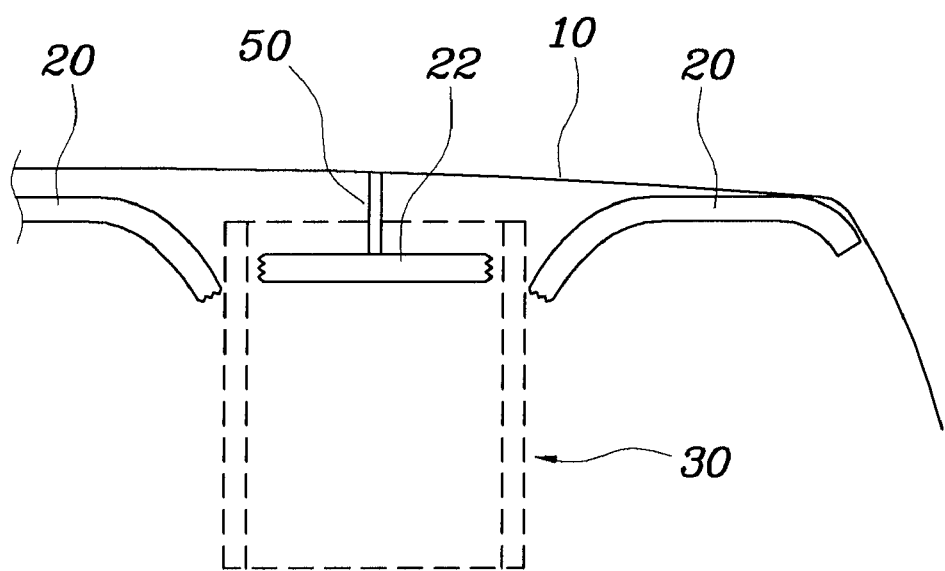
FIG. 4 is a front schematic view illustrating the procedure in which the airbag cushion of the airbag system shown in FIG. 2 is deployed by tearing a headliner.

Meanwhile, as shown in FIGS. 3 and 4, a circular cover 22 is delimited in the headliner 20 by a perforated line 21 so that force for deploying the airbag cushion 30 can also be applied to the circular cover 22. When the airbag cushion 30 is deployed, as the headliner 20 is torn along the perforated line 21, the circular cover 22 is separated from the headliner 20.

The center portion of the circular cover 22, separated in this way, is secured to the roof panel 10 by way of a separate connector 50, as shown in FIG. 4, so that the circular cover 22 does not strike the occupant or impede the deployment of the airbag cushion 30.

Furthermore the circular cover 22 may function to guide the airbag cushion 30 downwards with a predetermined shape. In various embodiments, the cylindrical tube shape can be formed.

When the deployment of the airbag cushion 30 is completed, the circular cover 22 is suspended from the roof panel 10 by the connector 50.

Figure 5:
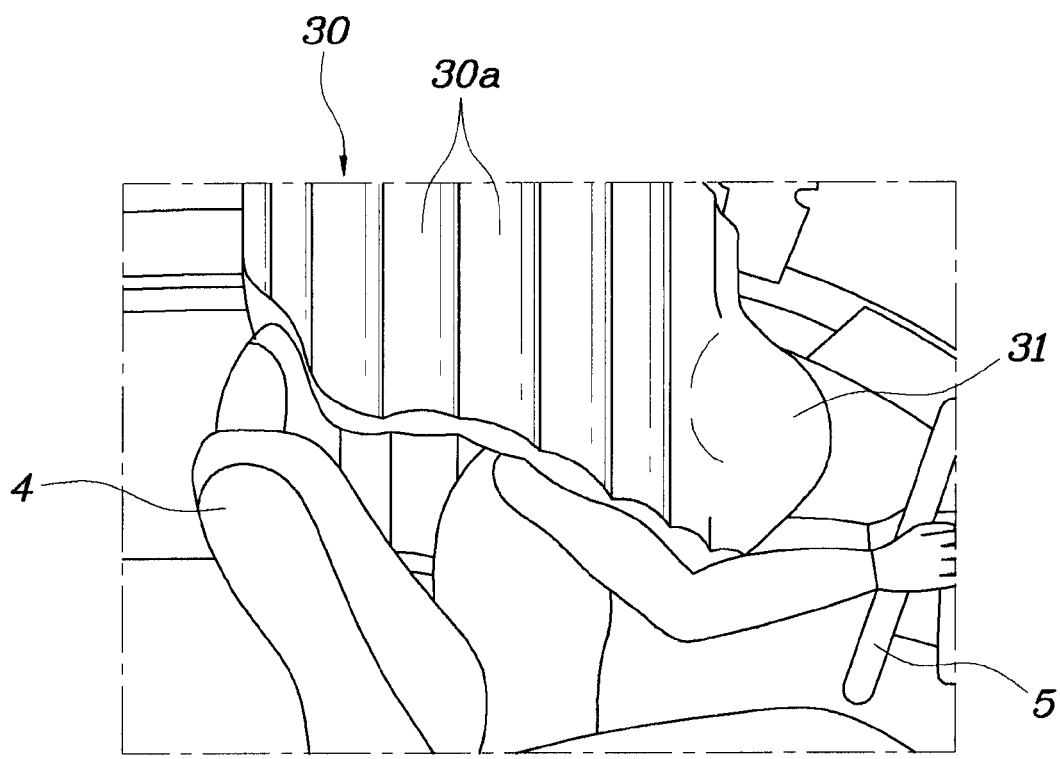
FIG. 5 is a view illustrating the state in which the airbag cushion of the airbag system shown in FIG. 2 is deployed in the event of a head-on collision.

The procedure in which the tube-type airbag cushion 30 is deployed in the event of a head-on collision and protects the occupant will be described below with reference to FIGS. 5 through 7.

When the head-on collision occurs, the airbag cushion 30 is deployed in such a way as to enclose the head of the occupant sitting on the seat 4 and protect the upper portion of the occupant's body in all directions. In this regard, since the upper portion of the occupant's body is enclosed in the airbag cushion 30, the forward leaning or movement of the occupant attributable to the shock is decreased, whereby the occupant can be effectively protected.

Figure 6:
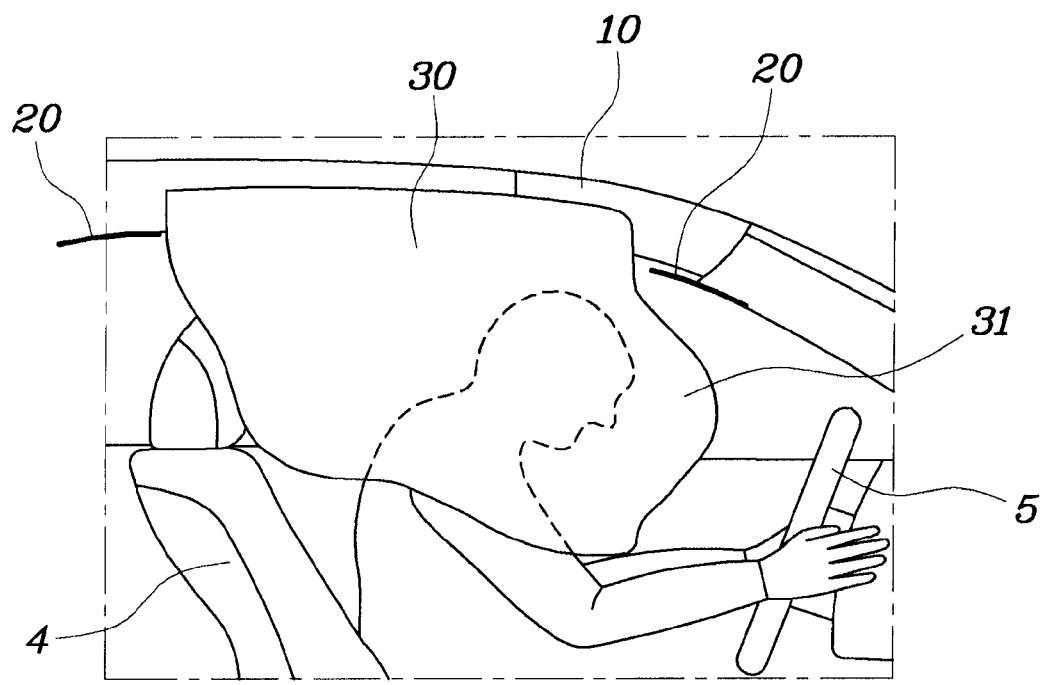
FIG. 6 is a transparent side view illustrating the airbag cushion shown in FIG. 5.
Figure 7:
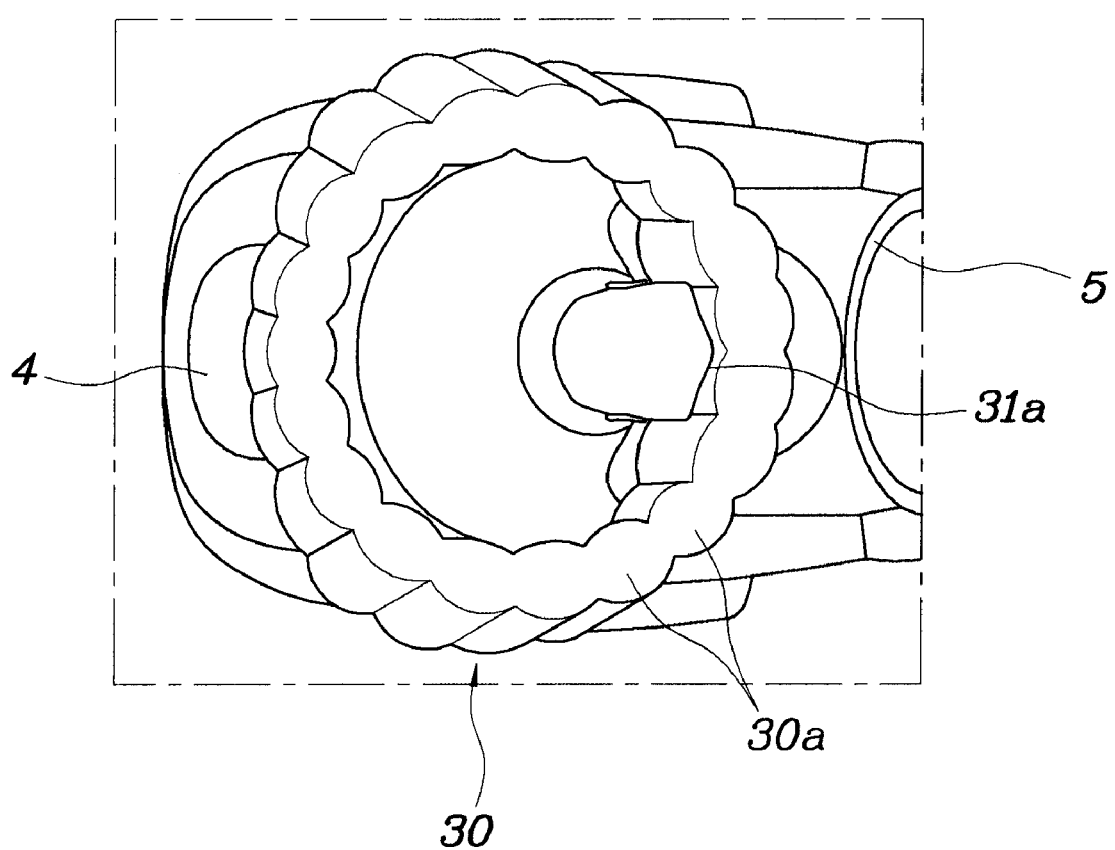
FIG. 7 is a plan view illustrating the airbag cushion shown in FIG. 5.

In other words, as shown in FIG. 6, the head of the occupant who leans forward due to the head-on collision first strikes the inner surface of the airbag cushion 30. Therefore, in the case that the airbag cushion 30 is appropriately deployed, the occupant may not strike a steering wheel 5. At this time, the airbag cushion 30 protects the occupant by virtue of internal gas pressure and the tensile stress thereof.

In various embodiments of the present invention, a protrusion 31 may be formed on the front surface of the airbag cushion 30. The protrusion 31 directly alleviates the shock applied to the occupant due to the impact with the steering wheel 5 and shortens the distance that the head of the occupant travels before striking the steering wheel 5, so that the magnitude of the shock is reduced.

It is preferred that the protrusion 31 be a protruding chamber which is isolated from the other portions of the airbag cushion 30 (such that, of course, the gas from the inflator 40 can be supplied into the protrusion). The protruding chamber can be formed in a manner such that it is isolated from the other portions by a partition wall or through a variety of ways, such as stitching the inner and outer skins of the airbag cushion 30 together. Meanwhile, the inner surface 31a of the protrusion 30 can have a particular contour appropriate for protecting the face and/or the chest of the occupant.

In various embodiments of the present invention, the airbag cushion 30 may be formed to have a configuration in which a plurality of column-shaped chambers 30a is connected along the circumference of the airbag cushion 30 while they extend in a vertical direction and communicate with one another.

Figure 8:
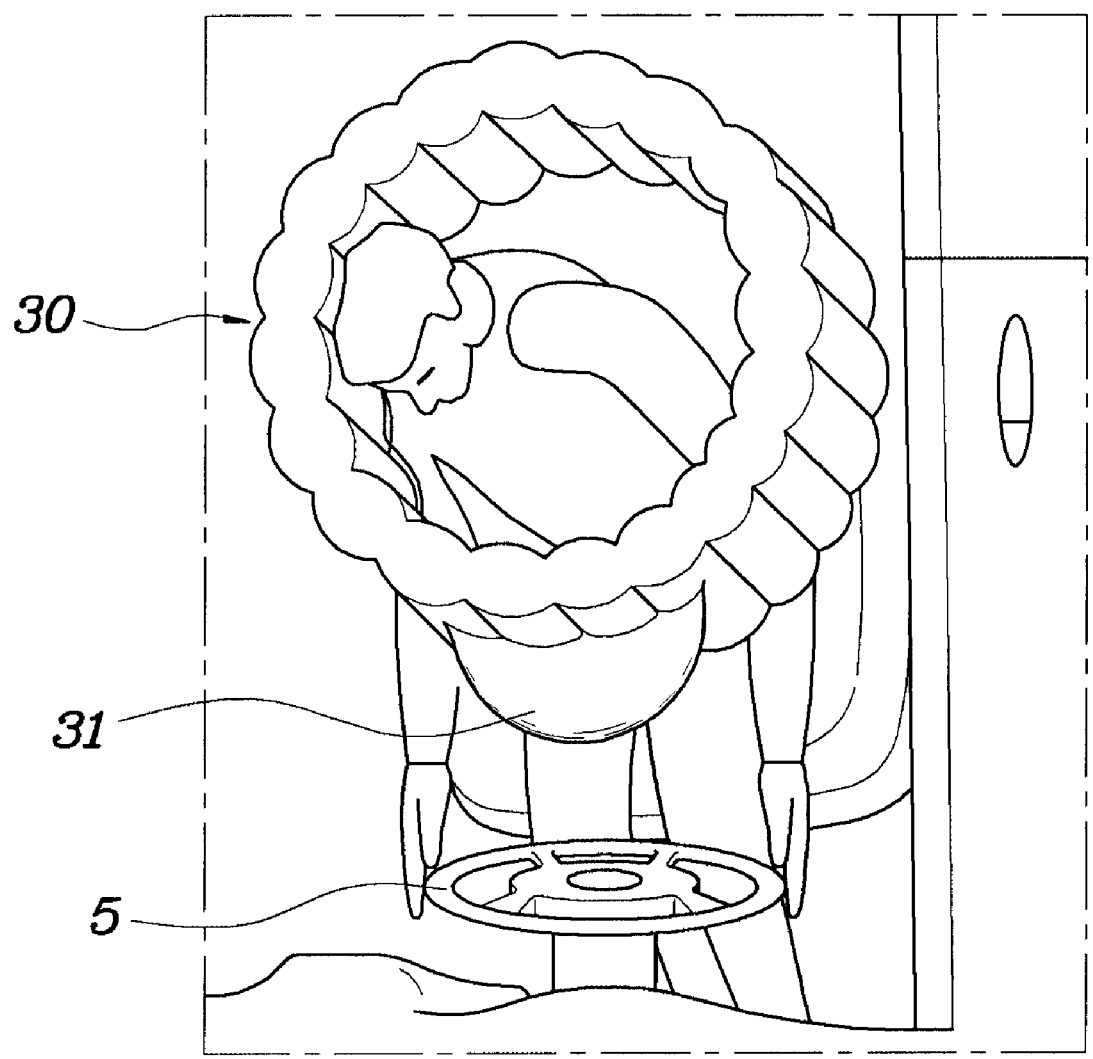
FIG. 8 is a view illustrating the deployment of an exemplary airbag cushion in the event of a side impact.

Referring to FIG. 8, the airbag cushion 30 has a configuration which may be embossed at regular intervals along the circumference thereof.

Due to the structure of the chambers 30a, the airbag cushion 30 can be quickly deployed downwards by the gas pressure, and the shock-absorbing characteristic thereof can be improved.

The airbag cushion 30 is designed to be deployed so as to enclose the chest and the shoulder of the occupant sitting on the seat 4. In consideration of this, as can be readily seen from FIGS. 5 and 6, the airbag cushion 30 is designed such that the front portion thereof is somewhat longer than the rear portion thereof.

That is to say, since the back and the head of the occupant are supported by the seat 4, the rear portion of the airbag cushion 30 is designed such that the deployment of the airbag cushion 30 is not interfered with by the seat 4, and the front portion of the airbag cushion 30 is designed such that the chest of the occupant can be enclosed by the airbag cushion 30 to thus be properly protected. Therefore, the airbag cushion 30 may be designed to sufficiently enclose the upper portion of the occupant's body so that the occupant is prevented from being released from the airbag cushion 30 regardless of the direction in which the occupant moves.

FIG. 8 is a view illustrating that the tube-type airbag cushion 30 can effectively protect the occupant even in the event of a side impact crash or a rollover accident.

Referring to FIG. 8, in the event of a side impact crash or a rollover accident, the occupant is likely to be severely biased leftward, rightward, forward or rearward. In this case, as the tube-type airbag cushion 30 can enclose the upper portion of the occupant's body, the airbag cushion 30 can limit the movement of the occupant to thus prevent the occupant from striking another occupant. Further, in the event of a rollover accident, the airbag cushion 30 can effectively prevent the occupant from being ejected out of the vehicle.

As is apparent from the above description, the airbag system for a vehicle according to an aspect of the present invention confers advantages in that the upper portion of a passenger sitting on a seat is protected in all directions by a tube-type airbag cushion in the event of an accident, whereby the passenger can be protected from shocks in the event of a head-on collision, a side impact crash or a rollover accident.

Also, the airbag system according to another aspect of the present invention can appropriately protect even a passenger who has not fastened a seat belt, and can effectively prevent the passenger from being ejected out of a vehicle and thereby being seriously wounded.

In further another aspect of the present invention, the airbag system for a vehicle of the present invention can prevent an occupant from being ejected out of a vehicle in an accident such as a rollover and thereby being seriously wounded.

For convenience in explanation and accurate definition in the appended claims, the terms "upper", "front", "leftward", "rightward", "forward", and "rearward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag system for a vehicle, comprising:
   an inflator for supplying gas pressure;
   an airbag housing installed in a vehicle roof above an occupant seat; and
   an airbag cushion installed in the airbag housing, wherein the airbag is deployed by tearing a circular cover from a roof headliner using the gas pressure provided from the inflator in such a way as to form an inflated cylindrical tubular cushion surrounding an upper portion of an occupant sitting on the occupant seat:
   wherein the inflator is installed adjacent a pillar; and
   wherein the roof headliner includes a perforated line formed along a circumference of the circular cover.

2. The airbag system for a vehicle of the claim 1, wherein the airbag housing is disposed between a roof panel and the roof headliner.

3. The airbag system for a vehicle of the claim 1, wherein in a non-deployed state, the airbag cushion is folded in a shape of a hollow hoop.

4. The airbag system for a vehicle of the claim 3, wherein in a deployed state, the airbag cushion is hollow-tube shaped.

5. The airbag system of claim 1, wherein a protrusion is formed on a front surface of the airbag cushion to protect the occupant from being injured by a steering wheel.

6. The airbag system of claim 1, wherein the airbag cushion is configured to have a plurality of chambers connected along a circumference of the airbag cushion, extending in a vertical direction thereof.

7. The airbag system of claim 6, wherein the chambers fluid-communicate with one another.

8. The airbag system of claim 6, wherein the chambers are column shaped.

9. The airbag system of claim 6, wherein a protrusion is formed on a front surface of the airbag cushion to protect the occupant from being injured by a steering wheel.

10. The airbag system of claim 9, wherein the protrusion comprises a protruding chamber which communicates with other chambers.

11. The airbag system of claim 1, wherein the airbag cushion is configured to enclose the chest and shoulders of the occupant sitting on the occupant seat upon deployment thereof.

12. The airbag system of claim 1, wherein the airbag cushion is formed such that a front portion thereof has a height greater than that of a rear portion thereof.

13. The airbag system of claim 1, wherein a cover is delimited in the roof headliner by a perforated line so that force for deploying the airbag cushion can be applied to the cover.

14. The airbag system of claim 13, wherein the cover is connected to the roof panel.

15. The airbag system of claim 13, wherein the airbag cushion is aligned substantially along the perforated line and positioned thereon.

16. A passenger vehicle comprising the airbag system of claim 1.

* * * * *